(12) United States Patent
Yoo et al.

(10) Patent No.: US 11,361,523 B2
(45) Date of Patent: Jun. 14, 2022

(54) INTEGRATED RENDERING METHOD FOR VARIOUS EXTENDED REALITY MODES AND DEVICE HAVING THEREOF

(71) Applicant: KOREA INSTITUTE OF SCIENCE AND TECHNOLOGY, Seoul (KR)

(72) Inventors: Byounghyun Yoo, Seoul (KR); Yongjae Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 17/036,119

(22) Filed: Sep. 29, 2020

(65) Prior Publication Data

US 2021/0174602 A1 Jun. 10, 2021

(30) Foreign Application Priority Data

Dec. 10, 2019 (KR) ........................ 10-2019-0163954

(51) Int. Cl.
| | |
|---|---|
| *G06T 19/20* | (2011.01) |
| *G06T 19/00* | (2011.01) |
| *G06K 9/62* | (2022.01) |
| *G06F 3/0482* | (2013.01) |

(52) U.S. Cl.
CPC ............ *G06T 19/20* (2013.01); *G06K 9/6201* (2013.01); *G06T 19/006* (2013.01); *G06F 3/0482* (2013.01); *G06T 2200/24* (2013.01); *G06T 2219/2012* (2013.01)

(58) Field of Classification Search
CPC ... G06T 19/20; G06T 19/006; G06T 2200/24; G06T 2219/2012; G06K 9/6201; G06F 3/0482

See application file for complete search history.

(56) References Cited

U.S. PATENT DOCUMENTS

| | | | |
|---|---|---|---|
| 2016/0314624 A1* | 10/2016 | Li | ........................ G06F 3/0482 |
| 2020/0042083 A1* | 2/2020 | Min | ........................ G06F 3/013 |
| 2020/0234499 A1* | 7/2020 | Hwang | ................ H04N 21/434 |

* cited by examiner

*Primary Examiner* — Chong Wu
(74) *Attorney, Agent, or Firm* — Cantor Colburn LLP

(57) ABSTRACT

Relating to an the integrated rendering method for various extended reality modes and a device having thereof, loading an XR-scene content including at least one virtual object content representing an extended reality image from a storage and representing a virtual object included in the extended reality image; inputting a selection, from a user, of any one extended reality mode among a plurality of extended reality modes including a virtual reality mode and an augmented reality mode; and maintaining or converting a property of each of a plurality of rendering options for at least one virtual object content according to the selected extended reality mode, and rendering at least one virtual object content having the maintained or converted property. Therefore, a virtual reality image and an augmented reality image can be generate from one XR-scene content.

9 Claims, 10 Drawing Sheets

FIG. 6A

```
1
2
3
4
5   <wxr-world>
6     <script src="https://cdn.jsdelivr.net/gh/webcomponents/webcomponentsjs@v1.1.0/webcomponents-lite.js"></script>
7     <link href="https://libs.webizing.org/wxr-0.0.html" rel="import">
8     <style id="internal">
73
74    <wxr-description
75        title="insstek AR"
76        img="https://wxr.nyc3.digitaloceanspaces.com/ar3dp/thumb/ar-thumb.png"
77        desc="insstek 3D printer maintenance using WXR AR browser"></wxr-description>
78    <wxr-view
79        default="3D"
80        current="3D"
81        modes="['3D','AR','VR']"></wxr-view>
82    <wxr-ar engine="vuforia"></wxr-ar>
83
84    <wxr-camera
85        fovy="61"
86        near="0.050000024999875001"
87        far="10000.099999934480"
88        fov="63.5824980897939"
89        aspect="1.7053669222343921"></wxr-camera>
90    <wxr-space augbase="https://wxr.nyc3.digitaloceanspaces.com/ar3dp/target/test/stones">
91
92        <wxr-light-ambient color="0xf0f0f0" intensity="0.3"></wxr-light-ambient>
93        <wxr-light-directional color="0xf0f0f0" intensity="0.5"></wxr-light-directional>
94
95        <!-- ballvalve handle -->
96        <wxr-aranchor id="STEP01" src="https://wxr.nyc3.digitaloceanspaces.com/ar3dp/target/ballvalve/01">
97            <wxr-obj id="handle" obj="00_handle.obj" mtl="00_handle.mtl" base-url="https://wxr.nyc3.digitaloceanspaces.com/ar3dp/resources/models/valve_3d"></wxr-obj>
98            <wxr-obj id="handle_arrow" obj="00_arrow.obj" mtl="00_arrow.mtl" base-url="https://wxr.nyc3.digitaloceanspaces.com/ar3dp/resources/models/valve_3d"></wxr-obj>
99            <wxr-plane id="annotation01" texture="https://wxr.nyc3.digitaloceanspaces.com/ar3dp/resources/dialog/valve_ar_reassem/step03.jpg"></wxr-plane>
100       </wxr-aranchor>
101
102       <!-- ballvalve upper cover -->
103       <wxr-target id="STEP02" src="https://wxr.nyc3.digitaloceanspaces.com/ar3dp/target/ballvalve/02">
104           <wxr-obj id="cover" obj="cover.obj" mtl="cover.mtl" base-url="https://wxr.nyc3.digitaloceanspaces.com/ar3dp/resources/models/valve_ar"></wxr-obj>
105           <wxr-obj id="screws" obj="screws.obj" mtl="screws.mtl" base-url="https://wxr.nyc3.digitaloceanspaces.com/ar3dp/resources/models/valve_ar"></wxr-obj>
106           <wxr-plane id="annotation02" texture="https://wxr.nyc3.digitaloceanspaces.com/ar3dp/resources/dialog/valve_ar_reassem/step02.jpg"></wxr-plane>
107       </wxr-target>
108
109       <!-- ballvalve seating -->
110       <wxr-target id="STEP03" src="https://wxr.nyc3.digitaloceanspaces.com/ar3dp/target/ballvalve/03">
111           <wxr-obj id="seat" obj="seat.obj" mtl="seat.mtl" base-url="https://wxr.nyc3.digitaloceanspaces.com/ar3dp/resources/models/valve_ar"></wxr-obj>
112           <wxr-obj id="ball" obj="04_ball.obj" mtl="04_ball.mtl" base-url="https://wxr.nyc3.digitaloceanspaces.com/ar3dp/resources/models/valve_3d"></wxr-obj>
113           <wxr-plane id="annotation03" texture="https://wxr.nyc3.digitaloceanspaces.com/ar3dp/resources/dialog/valve_ar_reassem/step01.jpg"></wxr-plane>
114       </wxr-target>
115
116       <!-- ballvalve lower cover -->
117       <wxr-obj id="base" obj="base-ar.obj" mtl="base-ar.mtl" base-url="https://wxr.nyc3.digitaloceanspaces.com/ar3dp/resources/models/valve_ar"></wxr-obj>
118
119   </wxr-space>
120 </wxr-world>
```

FIG. 6B

```
1
2
3
4
5   <wxr-world>
6       <script src="https://cdn.jsdelivr.net/gh/webcomponents/webcomponentsjs@v1.1.0/webcomponents-lite.js"></script>
7       <link href="https://libs.webizing.org/wxr-0.8.html" rel="import">
8       <style id="internal">
73
74      <wxr-description
75              title="insstek AR"
76              img="https://wxr.nyc3.digitaloceanspaces.com/ar3dp/thumb/ar-thumb.png"
77              desc="insstek 3D printer maintenance using WXR AR browser"></wxr-description>
78      <wxr-view
79              default="3D"
80              current="3D"
81              modes="['3D','AR','VR']"></wxr-view>
82      <wxr-ar engine="vuforia"></wxr-ar>
83
84      <wxr-camera
85              fovy="61"
86              near="0.05000082499987500001"
87              far="10000.09999993400"
88              fov="63.5824998097939"
89              aspect="1.7053669222343921"></wxr-camera>
90      <wxr-space augbase="https://wxr.nyc3.digitaloceanspaces.com/ar3dp/target/test/stones">
91
92          <wxr-light-ambient color="0xf0f0f0" intensity="0.3"></wxr-light-ambient>
93          <wxr-light-directional color="0xf0f0f0" intensity="0.5"></wxr-light-directional>
94
95          <!-- ballvalve handle -->
96          <wxr-target id="STEP01" src="https://wxr.nyc3.digitaloceanspaces.com/ar3dp/target/ballvalve/01">
97              <wxr-obj id="handle" obj="00_handle.obj" mtl="00_handle.mtl" base-url="https://wxr.nyc3.digitaloceanspaces.com/ar3dp/
                  resources/models/valve_3d"></wxr-obj>
98              <wxr-obj id="handle_arrow" obj="00_arrow.obj" mtl="00_arrow.mtl" base-url="https://wxr.nyc3.digitaloceanspaces.com/ar3dp/
                  resources/models/valve_3d"></wxr-obj>
99              <wxr-plane id="annotation01" texture="https://wxr.nyc3.digitaloceanspaces.com/ar3dp/resources/dialog/valve_ar_reassem/
                  step03.jpg"></wxr-plane>
100         </wxr-target>
101
102         <!-- ballvalve upper cover -->
103         <wxr-target id="STEP02" src="https://wxr.nyc3.digitaloceanspaces.com/ar3dp/target/ballvalve/02">
104             <wxr-obj id="cover" obj="cover.obj" mtl="cover.mtl" base-url="https://wxr.nyc3.digitaloceanspaces.com/ar3dp/resources/models/
                  valve_ar"></wxr-obj>
105             <wxr-obj id="screws" obj="screws.obj" mtl="screws.mtl" base-url="https://wxr.nyc3.digitaloceanspaces.com/ar3dp/resources/
                  models/valve_ar"></wxr-obj>
106             <wxr-plane id="annotation02" texture="https://wxr.nyc3.digitaloceanspaces.com/ar3dp/resources/dialog/valve_ar_reassem/
                  step02.jpg"></wxr-plane>
107         </wxr-target>
108
109         <!-- ballvalve seatring -->
110         <wxr-target id="STEP03" src="https://wxr.nyc3.digitaloceanspaces.com/ar3dp/target/ballvalve/03">
111             <wxr-obj id="seat" obj="seat.obj" mtl="seat.mtl" base-url="https://wxr.nyc3.digitaloceanspaces.com/ar3dp/resources/models/
                  valve_ar"></wxr-obj>
112             <wxr-obj id="ball" obj="04_ball.obj" mtl="04_ball.mtl" base-url="https://wxr.nyc3.digitaloceanspaces.com/ar3dp/resources/
                  models/valve_3d"></wxr-obj>
113             <wxr-plane id="annotation03" texture="https://wxr.nyc3.digitaloceanspaces.com/ar3dp/resources/dialog/valve_ar_reassem/
                  step01.jpg"></wxr-plane>
114         </wxr-target>
115
116         <!-- ballvalve lower cover -->
117         <wxr-obj id="base" obj="base-ar.obj" mtl="base-ar.mtl" base-url="https://wxr.nyc3.digitaloceanspaces.com/ar3dp/resources/models/
                  valve_ar"></wxr-obj>
118
119     </wxr-space>
120 </wxr-world>
```

FIG. 6C

```
1
2
3
4
5   <wxr-world>
6       <script src="https://cdn.jsdelivr.net/gh/webcomponents/webcomponentsjs@v1.1.0/webcomponents-lite.js"></script>
7       <link href="https://libs.webizing.org/wxr-0.8.html" rel="import">
8       <style id="internal">
73
74      <wxr-description
75          title="insstek AR"
76          img="https://wxr.nyc3.digitaloceanspaces.com/ar3dp/thumb/ar-thumb.png"
77          desc="insstek 3D printer maintenance using WXR AR browser"></wxr-description>
78      <wxr-view
79          default="3D"
80          current="3D"
81          modes="['3D','AR','VR']"></wxr-view>
82      <wxr-ar engine="vuforia"></wxr-ar>
83
84      <wxr-camera
85          fovy="61"
86          near="0.85000024999875001"
87          far="10000.099999934488"
88          fov="63.5824998097939"
89          aspect="1.7853669222343921"></wxr-camera>
90      <wxr-space augbase="https://wxr.nyc3.digitaloceanspaces.com/ar3dp/target/test/stones">
91
92          <wxr-light-ambient color="0xf0f0f0" intensity="0.3"></wxr-light-ambient>
93          <wxr-light-directional color="0xf0f0f0" intensity="0.5"></wxr-light-directional>
94
95          <!-- ballvalve handle -->
96          <wxr-aranchor id="STEP01" src="https://wxr.nyc3.digitaloceanspaces.com/ar3dp/target/ballvalve/01">
97              <wxr-obj id="handle" obj="00_handle.obj" mtl="00_handle.mtl" base-url="https://wxr.nyc3.digitaloceanspaces.com/ar3dp/resources/models/valve_3d"></wxr-obj>
98              <wxr-obj id="handle_arrow" obj="00_arrow.obj" mtl="00_arrow.mtl" base-url="https://wxr.nyc3.digitaloceanspaces.com/ar3dp/resources/models/valve_3d"></wxr-obj>
99              <wxr-plane id="annotation01" texture="https://wxr.nyc3.digitaloceanspaces.com/ar3dp/resources/dialog/valve_ar_reassem/step03.jpg"></wxr-plane>
100         </wxr-aranchor>
101
102         <!-- ballvalve upper cover -->
103         <wxr-target id="STEP02" src="https://wxr.nyc3.digitaloceanspaces.com/ar3dp/target/ballvalve/02">
104             <wxr-obj id="cover" obj="cover.obj" mtl="cover.mtl" base-url="https://wxr.nyc3.digitaloceanspaces.com/ar3dp/resources/models/valve_ar"></wxr-obj>
105             <wxr-obj id="screws" obj="screws.obj" mtl="screws.mtl" base-url="https://wxr.nyc3.digitaloceanspaces.com/ar3dp/resources/models/valve_ar"></wxr-obj>
106             <wxr-plane id="annotation02" texture="https://wxr.nyc3.digitaloceanspaces.com/ar3dp/resources/dialog/valve_ar_reassem/step02.jpg"></wxr-plane>
107         </wxr-target>
108
109         <!-- ballvalve seatring -->
110         <wxr-target id="STEP03" src="https://wxr.nyc3.digitaloceanspaces.com/ar3dp/target/ballvalve/03">
111             <wxr-obj id="seat" obj="seat.obj" mtl="seat.mtl" base-url="https://wxr.nyc3.digitaloceanspaces.com/ar3dp/resources/models/valve_ar"></wxr-obj>
112             <wxr-obj id="ball" obj="04_ball.obj" mtl="04_ball.mtl" base-url="https://wxr.nyc3.digitaloceanspaces.com/ar3dp/resources/models/valve_3d"></wxr-obj>
113             <wxr-plane id="annotation03" texture="https://wxr.nyc3.digitaloceanspaces.com/ar3dp/resources/dialog/valve_ar_reassem/step01.jpg"></wxr-plane>
114         </wxr-target>
115
116     </wxr-space>
117 </wxr-world>
118
```

INTEGRATED RENDERING METHOD FOR VARIOUS EXTENDED REALITY MODES AND DEVICE HAVING THEREOF

CROSS-REFERENCE TO RELATED APPLICATIONS

The present application claims priority under 35 U.S.C 119(a) to Korean Application No. 10-2019-0163954, filed on Dec. 10, 2019, in the Korean Intellectual Property Office, which is incorporated herein by reference in its entirety as set forth in full.

BACKGROUND

1. Technical Field

The present invention relates to an integrated rendering method for various extended reality modes and more specifically, it relates to an integrated rendering method capable of generating augmented reality and virtual reality images based on an extended reality scene content.

2. Related Art

A virtual reality (VR) technology simulates an object, a background, and the like in a reality world with a computer, and provides a user with simulated virtual object and virtual background, an augmented reality (AR) technology provides a virtual object, which is made virtually, on an image of the reality world together, and a mixed reality (MR) technology combines the virtual reality with the reality world to provide an environment in which a physical object and a virtual object interact with each other.

Since the virtual reality (VR) technology converts all the object and the background in the reality world into the virtual objects and provides a video constituted of only the virtual objects. Therefore, all the object and the background are rendered. In contrast, the augmented reality (AR) technology provides a video in which only the target object is rendered and the other object and background are not rendered. Therefore, only the target object is rendered and the others are not rendered. A virtual reality (VR) screen indicates the virtual object which is generated by 3D rendering of all the object and the background, whereas an augmented reality (AR) screen indicates a real object and a reality space in which only a part of the objects is a virtual object generated by 3D rendering and the others are imaged by a camera module.

Due to the difference between the virtual reality (VR) and the augmented reality (AR) described above, in the related art, there is a difference between a rendering method for a virtual reality (VR) image and a rendering method for an augmented reality (AR) image to a user of a user terminal. Accordingly, in the related art, a scene content representing the virtual reality (VR) image and a scene content representing the augmented reality (AR) image are differently created, and each created scene content is analyzed and rendered by a different application. The virtual reality (VR) application and the augmented reality (AR) application interpret and render the scene contents in different ways.

Due to the difference described above, the virtual reality (VR) application cannot properly interpret the scene content representing the augmented reality (AR) image, and similarly, the augmented reality (AR) application cannot properly interpret the scene content representing the virtual reality (VR) image. Accordingly, even in the user terminal capable of providing the user with both the virtual reality (VR) and augmented reality (AR) screens, a different scene code and a different application are executed when the virtual reality (VR) mode is changed to the augmented reality (AR) mode. Therefore, there is a problem that the virtual reality (VR) mode and the augmented reality (AR) mode are not compatible with each other.

In addition, as described above, in the related art, the virtual reality/augmented reality technology requires separate applications and separate scene contents to render the virtual reality image and the augmented reality image. Therefore, there is a problem of requiring a lot of data for storing the separate applications and the separate scene contents.

SUMMARY

An object of the present invention is to provide an integrated rendering method for generating augmented reality and virtual reality images, and a device having thereof. In addition, the present invention is not limited to the technical problems as described above, and other technical problems may be derived from the following description.

According to an aspect of the present invention, there is provided an integrated rendering method for various extended reality modes including: a step of loading an extended reality (XR) scene content representing an XR image and including at least one virtual object content representing a virtual object included in the extended reality image from a storage; a step of inputting a selection, from a user, of any one extended reality mode among a plurality of extended reality modes including a virtual reality mode and an augmented reality mode; and a step of maintaining or converting a property of each of a plurality of rendering options for the at least one virtual object content according to the selected extended reality mode, and rendering the at least one virtual object content having the maintained or converted property.

In the step of rendering, when the selected extended reality mode is the virtual reality mode, maintaining the property of each of the plurality of rendering options and rendering the at least one virtual object content according to the maintained property, and when the selected extended reality mode is the augmented reality mode, converting the property of each of the plurality of rendering options, and rendering the at least one virtual object content according to the converted property.

The step of rendering includes a step of converting, from visible to invisible, a property of a visible option instructing visible or invisible of the virtual object among the plurality of rendering options of the virtual object content, when the selected extended reality mode is the augmented reality mode; a step of detecting an augmented target object of the augmented reality mode from reality space image data indicating a reality space generated by a camera module; a step of converting, from invisible to visible, the property of the visible option of the virtual object content included in the XR-scene content corresponding to the detected augmented target object; and a step of rendering a virtual object in which the property of the visible option of the virtual object content is visible in the XR-scene content.

In the step of converting, from visible to invisible, the property of the visible option, converting, from visible to invisible, a visible option of a remaining virtual object content except for a lighting-related content in the XR-scene content.

The step of rendering further includes a step of converting a ground color option included in the XR-scene content to transparent and converting a background of the extended reality image to the reality space image data, when the selected extended reality mode is the augmented reality mode.

The step of rendering further includes a step of converting the ground color option included in the XR-scene content to a predetermined ground color and converting the background of the extended reality image to the predetermined ground color, when the selected extended reality mode is the virtual reality mode.

In the step of detecting the augmented target object, extracting a shape included in the reality space image data, comparing the extracted shape with a shape of the augmented target object, and detecting a shape matching the shape of the augmented target object as the augmented target object.

According to another aspect of the present invention, there is provided a user terminal for integrated rendering of various extended reality modes including: a processor that loads an extended reality (XR) scene content representing an XR image and including at least one virtual object content representing a virtual object included in the extended reality image from a storage; an input module that inputs a selection, from a user, of any one extended reality mode of a plurality of extended reality modes including a virtual reality mode and an augmented reality mode; a rendering option conversion unit that maintains or converts a property of each of a plurality of rendering options for the at least one virtual object content according to the selected extended reality mode; and a rendering unit that renders the at least one virtual object content having the maintained or converted property.

The user terminal converts the rendering option of the virtual object content included in one extended reality scene content according to the extended reality mode selected by the user, generates the extended reality image data according to the converted rendering option, and provides the user with the generated extended reality image data. When the user selects the virtual reality mode using one extended reality scene content, the user terminal generates image data indicating the virtual reality and provides the user with the image data. When the user selects the augmented reality mode, the user terminal generates image data indicating the augmented reality and provides the user with the image data. In order to generate the virtual reality image or the augmented reality image, without creating a separate scene content or installing a separate application, it is possible to provide the virtual reality image and the augmented reality image to the user by using one extended reality scene content and one application.

In addition, since the user terminal can provide the user with the virtual reality image and the augmented reality image via one extended reality scene content and one extended reality application, an amount of data required to provide the extended reality is reduced, thereby saving a storage space in the storage.

In addition, in the integrated rendering method according to the embodiments of the present invention, the augmented reality image is generated in consideration of lighting that affects the augmented target object when the augmented reality image is generated. Therefore, it is possible to generate a virtual object extremely similar to the reality object of the reality space in the augmented reality image, and to generate the augmented reality image close to the reality space. Accordingly, the user terminal can provide the user with a high immersion feeling.

BRIEF DESCRIPTION OF THE DRAWINGS

FIGS. 6A to 6C are examples of augmented reality scene contents of the present invention.

DETAILED DESCRIPTION OF THE EMBODIMENTS

Hereinafter, examples of the present invention will be described in detail with reference to the drawings. The examples of the present invention to be described below relate to a rendering method for an extended reality (XR) image. For those of ordinary skill in the art to which the examples of the present invention pertain, it can be understood that an "extended reality (XR)", which will be described below, refers to a concept including a virtual reality (VR), an augmented reality (AR), and a mixed reality (MR), means a technology in which an environment, in which a virtual world and a reality world are connected, is provided and a user can interact with the environment in real time. Hereinafter, a system that provides a user with a virtual reality (VR) environment and an augmented reality (AR) environment will be referred to as an "extended reality (XR) providing system".

Figure 1:
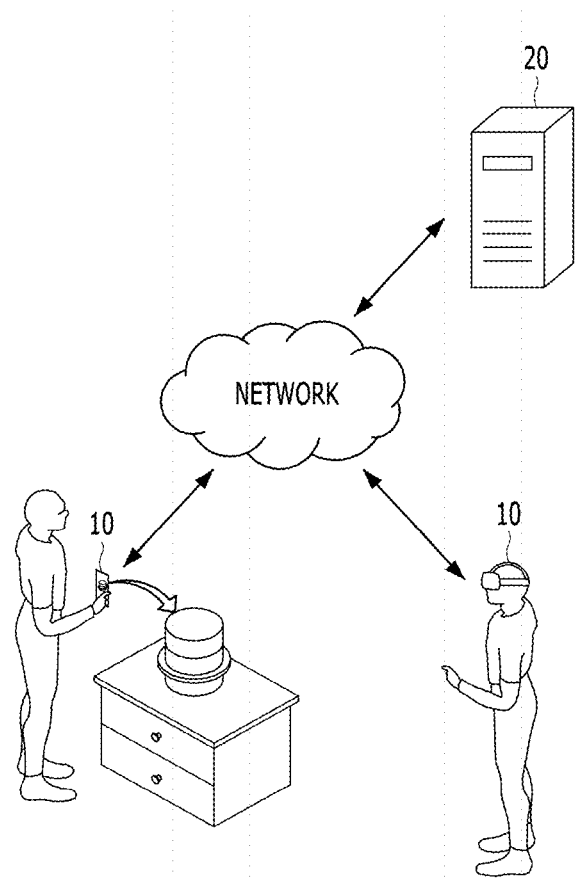
FIG. 1 is a view schematically illustrating an extended reality (XR) providing system according to an example of the present invention.

FIG. 1 is a view schematically illustrating the extended reality (XR) providing system according to an example of the present invention. Referring to FIG. 1, the extended reality providing system according to the present example includes user terminals 10 and an extended reality server 20. The extended reality server 20 stores, to a storage (not illustrated) thereof, an extended reality scene (XR-scene) content representing an extended reality image and including at least one virtual object content representing a virtual object included in the extended reality image, and an extended reality application interpreting the XR-scene content, and transmits the stored XR-scene content and extended reality application to the user terminal 10 via a network. The XR-scene content is a computer language that represents a scene of the extended reality in a structured format, and represents a virtual object and a background included in the scenes of the extended reality. An example of the XR-scene content is a programming code created in a markup language. The virtual object content represents a shape of the virtual object on the extended reality. The XR-scene content is configured of at least one virtual object content. The extended reality application renders the XR-scene content to generate virtual reality (VR), augmented reality (AR), and mixed reality (MR) image data. The generated virtual reality (VR), augmented reality (AR), and mixed reality (MR) image data are provided to the user via a display unit 106 of the user terminal 10.

The user terminal 10 is a device that provides the user with the extended reality image. The user terminal 10 provides the user with an extended reality environment via a preinstalled extended reality application. More specifically, the user terminal 10 receives the extended reality application and the XR-scene content from the extended reality server 20. The user terminal 10 interprets the received XR-scene content with the received extended reality application. The extended reality application generates the extended reality image data representing the extended reality by rendering the received XR-scene content, and provides the user with the extended reality image data generated via the display unit 106. The extended reality application maintains or converts the rendering options of the XR-scene content according to the extended reality mode selected by the user, and renders the XR-scene content having the maintained or converted rendering option to generate the extended reality image data.

For example, the extended reality application converts the rendering option of the virtual object content included in the XR-scene content according to whether the user selects the virtual reality mode or the augmented reality mode, and renders the virtual object content according to the converted rendering option. More specifically, when the user selects the virtual reality mode, the extended reality application converts the XR-scene content to generate the virtual reality image data representing the virtual reality, and renders the converted the XR-scene content to generate the virtual reality image data. The user terminal 10 provides the user with the generated virtual reality image data via the display unit 106, so that the user can experience the virtual reality environment. When the user selects the augmented reality mode, the extended reality application converts the XR-scene content to generate the augmented reality image data representing the augmented reality, and renders the converted XR-scene content to generate the augmented reality image data. The user terminal 10 provides the user with the generated augmented reality image data via the display unit 106, so that the user can experience the augmented reality environment.

The user terminal 10 provides the user with the generated extended reality image data via the display unit 106 thereof. Hereinafter, it is assumed that the extended reality application is installed in the user terminal 10 in advance. Examples of the user terminal 10 include a smartphone, a tablet PC, a head mounted display (HMD), a laptop, smart glasses, and the like.

Figure 2:
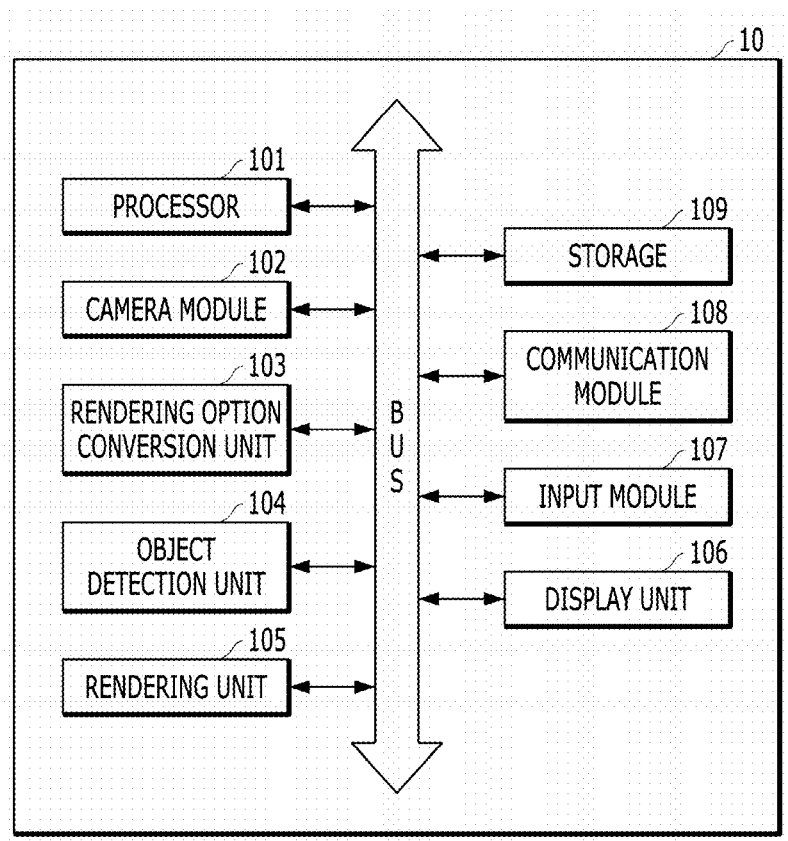
FIG. 2 is a configuration diagram of a user terminal illustrated in FIG. 1.

FIG. 2 is a configuration diagram of the user terminal illustrated in FIG. 1. Referring to FIG. 2, the user terminal 10 includes a processor 101, a camera module 102, a rendering option conversion unit 103, an object detection unit 104, a rendering unit 105, a display unit 106, an input module 107, a communication module 108, and a storage 109. The processor 101 processes a general task of the user terminal 10 such as a smartphone. The camera module 102 images the reality space in which the user terminal 10 is located, and generates image data indicating the located reality space.

The rendering option conversion unit 103 converts the rendering option of virtual object content included in the XR-scene content received from the extended reality server 20 according to the selected extended reality mode. As described above, the virtual reality and the augmented reality provide the user with screens different from each other. The rendering option conversion unit 103 converts the rendering option of virtual object content included in the XR-scene content to generate the extended reality image data according to the extended reality mode selected by the user of the user terminal 10. For example, when the user selects the augmented reality mode, the rendering option conversion unit 103 converts, from visible to invisible, a property of a visible option that indicates visible or invisible among rendering options of the object content of remaining objects except for the augmented target object to be rendered as the virtual object in the augmented reality mode.

In addition, the rendering option conversion unit 103 converts a ground color option indicating a color of a background of the extended reality image in the XR-scene content according to the selected extended reality mode. The rendering option conversion unit 103 maintains or converts the ground color option of the XR-scene content according to the extended reality mode selected by the user of the user terminal 10. For example, when the virtual reality mode is selected, the rendering option conversion unit 103 maintains the ground color option of the XR-scene content in white, and when the augmented reality mode is selected, the rendering option conversion unit 103 converts the ground color option of the XR-scene content to transparent.

The object detection unit 104 analyzes image data indicating the reality space generated by the camera module 102 and detects an augmented target object from the image data. When the user selects the augmented reality mode, the object detection unit 104 detects the augmented target object from the image data generated by the camera module 102. For example, the object detection unit 104 detects a target marker indicating the augmented target object in the image data received from the camera module 102. The target marker is a marker for identifying an object which is the rendering target of the augmented reality in augmented reality. The marker includes a quick response (QR) code, a bar code, a natural feature, and the like.

The rendering unit 105 renders the XR-scene content representing the extended reality image. The rendering unit 105 renders the virtual object content representing the virtual object included in the XR-scene content. The rendering unit 105 renders the XR-scene content to generate the extended reality image indicating the extended reality. The rendering unit 105 renders the XR-scene content received from the extended reality server and maintained or converted by the rendering option conversion unit 103. More specifically, the rendering unit 105 renders the XR-scene content according to the ground color option of the XR-scene content and the visible option of the virtual object content, and generates the extended reality image including the background and the virtual object according to the ground color option. The rendering unit 105 inputs the generated extended reality image to the display unit 106. For example, when the virtual reality mode is selected, the rendering unit 105 renders the XR-scene content in which the ground color option remains white and the visible option of the virtual object content remains visible, and generates the virtual reality image including the white background and the virtual object. When the augmented reality mode is selected, the rendering unit 105 renders the XR-scene content in which the ground color option is converted to transparent and the visible option of virtual object content except for the augmented target object is converted to invisible, and generates the augmented target image including the background of the image indicating the reality space and the augmented target object.

Here, the rendering option conversion unit 103, the object detection unit 104, and the rendering unit 105 may be implemented as a separate dedicated processor different from the processor 101, or implemented by executing a computer program of the processor 101.

The display unit 106 displays the extended reality image data. The display unit 106 displays the extended reality image data indicating the extended reality to provide the user of the user terminal 10 with the extended reality environment. The input module 107 receives an input of a command for manipulating the virtual object from the user, a command for rotating, enlarging, and reducing the screen in the displayed extended reality image data, or the like. Examples of the input module 107 include a touch screen panel, a motion controller, a keyboard, a mouse, a camera for recognizing hand gestures, and the like.

The communication module 108 supports a communication function to access a mobile communication base station or Wi-Fi repeater and communicate with the extended reality server 20 via a wide area network such as an Internet. The communication module 108 is connected to the extended reality server 20 via various communication methods such as 3G, 4G, 5G, WiFi, Wibro, and Zigbee, receives data from the extended reality server 20, and transmits and receives data to and from the extended reality server 20. The storage 109 stores the extended reality application and data used by the application in the user terminal 10, for example, the extended reality scene content and the like.

The user terminal 10 may further include additional configuration elements in addition to the configuration elements described above. For example, as illustrated in FIG. 2, the user terminal 10 includes a bus for transmitting data between various configuration elements, and includes a power module (not illustrated) that supplies driving power to each configuration element which is omitted in FIG. 2. In this way, description of the configuration elements that are apparent to those of ordinary skill in the art to which the present example pertains is omitted as the features of the present example are obscured. Hereinafter, each configuration element of the user terminal 10 will be described in detail in the process of describing a method for generating the extended reality image indicating the extended reality according to an example of the present invention.

Figure 3:
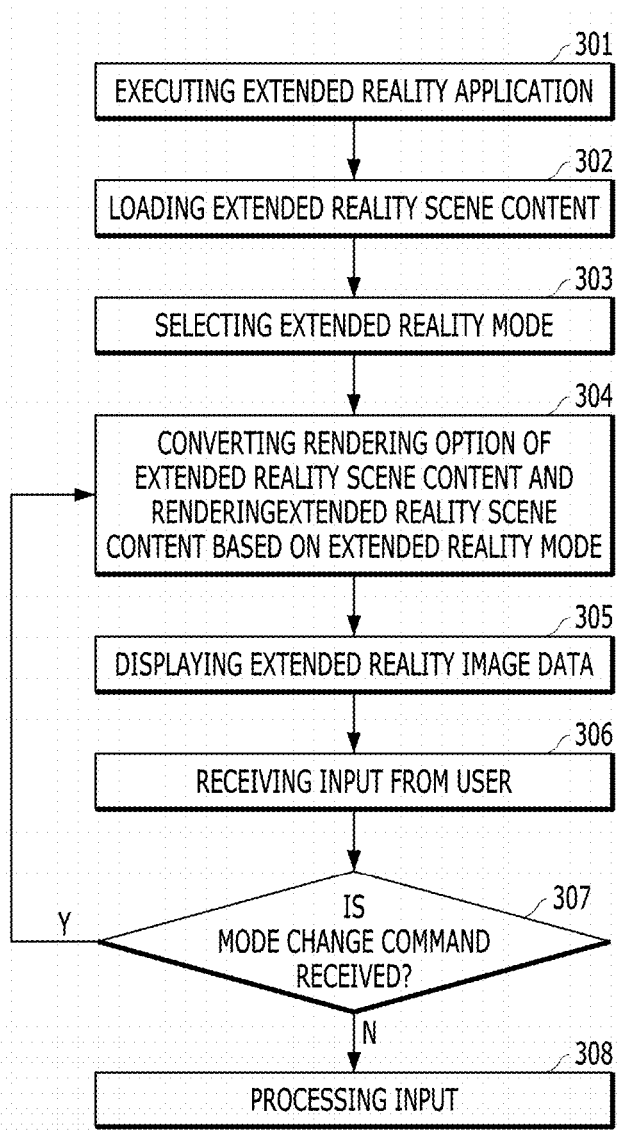
FIG. 3 is a flowchart of an integrated rendering method for various extended reality modes according to an example of the present invention.

FIG. 3 is a flowchart of an integrated rendering method for various extended reality modes according to an example of the present invention. Referring to FIG. 3, the integrated rendering method for various extended reality modes based on the extended reality mode according to the present example includes steps performed in time series in the user terminal 10 illustrated in FIG. 2.

In step 301, when the processor 101 of the user terminal 10 receives an input of a command from the user to execute the extended reality application via the input module 107, the processor 101 executes the extended reality application. As described above, the user terminal 10 is installed with the extended reality application by being downloaded from the extended reality server 20 before executing the extended reality application.

In step 302, the processor 101 of the user terminal 10 loads the XR-scene content. The user terminal 10 receives, from the user via the input module 107, or from the extended reality server 20 via the communication module 108, the extended reality (XR)-scene content including at least one virtual object content representing the extended reality image and representing the virtual object included in the extended reality image, and stores the extended reality (XR)-scene content in the storage 109. The processor 101 loads the extended reality scene content input from the user or the XR-scene content stored in the storage 109.

In step 303, the processor 101 of the user terminal 10 receives a selection, from the user via the input module 107, of any one extended reality mode of a plurality of extended reality modes including the virtual reality mode and the augmented reality mode. The user selects one of the virtual reality mode and the augmented reality mode, and inputs the selected extended reality mode via the input module 107 of the user terminal 10. The processor 101 of the user terminal 10 receives the selection of the extended reality mode of the user via the input module 107.

In step 304, the rendering unit 105 of the user terminal 10 maintains or converts a property of each of a plurality of rendering options for at least one virtual object content included in the XR-scene content loaded in step 302 according to any one of the extended reality modes selected in step 303, and renders at least one virtual object content having the maintained or converted property. More specifically, the rendering unit 105 maintains or converts the property of the rendering option of virtual object content included in the XR-scene content according to the extended reality mode selected by the user. For example, when the user selects the virtual reality mode, the rendering unit 105 maintains, to visible, the property of the visible option instructing visible or invisible of the virtual object among the rendering options of the virtual object content. When the user selects the augmented reality mode, the rendering unit 105 converts, from visible to invisible, the property of the visible option of the virtual object content. Examples of rendering options for virtual object content include various detailed options such as a visible option instructing visible or invisible of the virtual object, a chroma option instructing a chroma of the virtual object, and a texture option instructing a material of the virtual object.

The rendering unit 105 renders the virtual object content of the XR-scene content having maintained or converted property. As described above, the rendering unit 105 maintains, to visible or converts, to invisible, the property of the visible option of the virtual object content included in the XR-scene content according to the selected extended reality mode. The rendering unit 105 renders the virtual object content in which the property of the visible option is visible among the rendering options of at least one virtual object content included in the XR-scene content. The rendering unit 105 does not render the virtual object content in which the property of the visible option of the virtual object content is invisible. More specifically, the conversion and rendering of the XR-scene content will be described in detail below.

Figure 4:
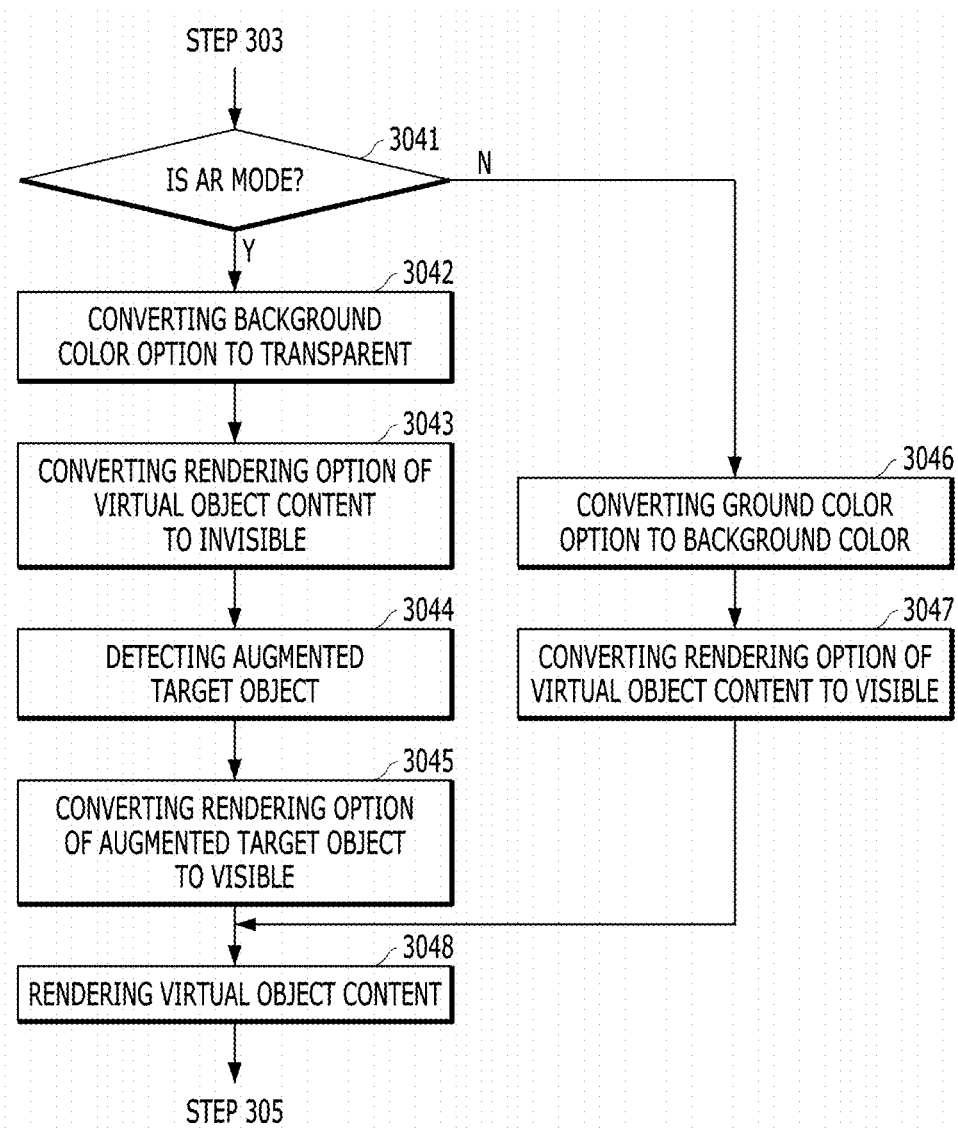
FIG. 4 is a detailed flowchart of a rendering step illustrated in FIG. 3.

FIG. 4 is a detailed flowchart of steps of rendering illustrated in FIG. 3. Referring to FIG. 4, in step 3041, the processor 101 of the user terminal 10 determines whether the extended reality mode selected in step 303 is the augmented reality mode. If the extended reality mode selected in step 303 is the augmented reality mode, the process proceeds to step 3042, otherwise, in other words, if the extended reality mode selected in step 303 is the virtual reality mode, the process proceeds to step 3046.

In step 3042, the rendering option conversion unit 103 of the user terminal 10 converts, to transparent, the property of the ground color option instructing the color of the background in the extended reality image in the XR-scene content. As described above, the augmented reality additionally provides the user with the virtual object on the image indicating the reality space. When the user selects the augmented reality mode, the display unit 106 of the user terminal 10 displays, on the screen, the augmented reality image including the virtual object of the augmented target object on the image indicating the reality space. When the user selects the augmented reality mode in step 303, the rendering option conversion unit 103 converts, to transparent, the property of the ground color option of the XR-scene content, and renders the XR-scene content having the converted ground color option to render the background transparently. Accordingly, even if the background of the XR-scene content is rendered, since the background of the extended reality image is transparent, the user can view the reality space image indicating the reality space generated by the camera module 102.

In step 3043, the rendering option conversion unit 103 of the user terminal 10 converts, from visible to invisible, the property of the visible option among the rendering options of virtual object content included in the XR-scene content. When the user selects the augmented reality mode, the rendering option conversion unit 103 converts, from visible to invisible, the visible option of the virtual object content included in the XR-scene content, so that the virtual object content included in the XR-scene content is not rendered. As described above, in the virtual reality mode, the user terminal 10 provides the user with an image indicating the virtual reality in which both the object and the background are rendered, whereas in the augmented reality mode, the user terminal 10 only renders the augmented target object and provides the user with an image indicating other actual space imaged by the camera module. Accordingly, in step 3043, when the augmented reality mode is selected, the user terminal 10 does not need to render other virtual object contents representing other virtual objects except for the virtual object contents indicating the augmented target object in the XR-scene content. Accordingly, the rendering option conversion unit 103 of the user terminal 10 converts, from visible to invisible, the property of the visible option among the rendering options of the virtual object content included in the XR-scene content. Therefore, the virtual object content representing other virtual objects except for the virtual object content representing the augmented target object is prevented from being rendered in the augmented reality mode.

In step 3044, the object detection unit 104 of the user terminal 10 detects a target to be augmented in the augmented reality mode from the image data indicating the reality space. The object detection unit 104 detects the augmented target object to generate the virtual object by being rendered in the augmented reality mode. The object detection unit 104 detects the augmented target object in the augmented reality mode from the image data generated by the camera module 102 of the user terminal 10. The camera module 102 generates image data indicating the reality space currently observed by the user terminal 10. When the augmented target object to be augmented in the augmented reality mode is detected from the image data indicating the reality space generated by the camera module 102, the user terminal 10 renders the virtual object represented by the virtual object content corresponding to the augmented target object, causes a rendered virtual object to be included in the image data currently generated by the camera module 102, and provides the user with the image data including the virtual object via the display unit 106. Accordingly, the user can view an image in which the reality world and the virtual object appear together via the display unit 106 of the user terminal 10.

As described above, the object detection unit 104 detects the augmented target object from the image data indicating the reality space generated by the camera module 102. The object detection unit 104 detects the augmented target object by a detecting method of the target marker indicating the augmented target object in the image data. The target marker is a marker for identifying a target to be augmented in the augmented reality mode. The object detection unit 104 identifies the augmented target object via the target marker detected from image data indicating a reality space.

The object detection unit 104 according to an example of the present invention extracts a shape included in the image data indicating the reality space via image processing, and detects the target marker indicating the augmented target object using the extracted shape. More specifically, the object detection unit 104 extracts shapes included in the image data indicating the reality space. For example, the object detection unit 104 extracts a feature point (key point) from the image data. The feature point is a point that is easy to be identified while being distinguished from the surrounding background in the image. The feature point is a point that can be easily identified even if a shape, size, or position of an object changes in the image data, and can be easily identified even if a viewpoint of the camera and lighting change. Examples of the feature point include a corner, an edge, and the like. The object detection unit 104 analyzes the extracted feature point and extracts the shapes included in the image data. The object detection unit 104 may extract the shapes included in the image data using an artificial neural network technique. A method for extracting the feature point and the shape from the image data is well known to those of ordinary skilled in the art to which this example pertains, and thus detailed description thereof is omitted to prevent further blurring of the features of the present example.

The object detection unit 104 extracts the target marker from the shapes extracted from the image data representing the reality space. More specifically, the object detection unit 104 compares the extracted shapes with the shape of the target marker stored in the storage 109 of the user terminal 10 in advance. The object detection unit 104 detects, as the target marker, a shape that matches the shape of the target marker among the shapes extracted from the image data based on the comparison result. The object detection unit 104 extracts, as the target marker, a shape identical to the shape of the target marker stored in the storage 109 in advance.

The storage 109 of the user terminal 10 stores the shape of the target marker in advance. As described above, the shape of the target marker is the shape of the target object to be augmented in the augmented reality mode. The object detection unit 104 compares the shape of the augmented target object stored in the storage 109 with shapes extracted from image data indicating the reality space generated by the camera module 102, and determines, as the target marker, a shape matching the shape of the target marker stored in advance. For example, if the augmented target is a powder container of a 3D printer, the storage 109 of the user terminal 10 stores, in advance, a shape of the powder container that is the augmented target. The object detection unit 104 compares the shape extracted from the image data indicating the reality space with the shape of the powder container stored in the storage 109 in advance. As a result of comparison, a shape matching the shape of the powder container stored in the storage 109 in advance is determined as the augmented target object.

In another example of the present invention, the storage 109 of the user terminal 10 may store any code, such as a quick response code (QR code), or a bar code, in the shape of the target marker. The user may attach the QR code or the bar code stored in the shape of the target marker to the target object to be augmented in the augmented reality mode to designate the augmented target in the reality space. For example, if the augmented target is the powder container, the user attaches the QR code stored, in the shape of the target marker in the storage 109, to the powder container that is the actual augmented target. The object detection unit 104 compares the shape of the QR code or the bar code stored in the storage 109 with the shapes extracted from the image data indicating the reality space, and can determine, as the target marker, a shape that matches the shape of the QR code or the bar code stored in advance.

In another example of the present invention, the target marker includes an electrical signal that is not visually identifiable. For example, the user terminal 10 may detect the target marker via a signal transmitted by a small wireless communication device. A wireless communication device that transmits a beacon signal including information on the shape and position of the augmented target is attached to the actual augmented object, and the wireless communication device attached to the actual augmented target transmits a signal for the target marker to the user terminal 10. The user terminal 10 may identify the shape and position of the target marker based on the received signal for the target marker. The user terminal 10 may identify the target marker in various ways in addition to the examples described above.

In step 3045, the rendering option conversion unit 103 of the user terminal 10 converts, to visible, the rendering option of the virtual object content representing the virtual object corresponding to the augmented target object detected in the XR-scene content. The rendering option conversion unit 103 converts, from invisible to visible again, the property of the visible option among the rendering options of the virtual object content representing the virtual object corresponding to the augmented target object detected in step 3044. By changing, to visible again, the property of the visible option of the virtual object content representing the augmented target object to be augmented to the virtual object in the augmented reality mode, the rendering unit 105 of the user terminal 10 renders the virtual object content representing the virtual object corresponding to the augmented target object to generate the virtual object of the augmented target object. As described above, in step 3043, the rendering option conversion unit 103 converts, from visible to invisible, the property of the visible option among the rendering options of the virtual object content included in the XR-scene content. In step 3045, the rendering option conversion unit 103 converts, from invisible to visible again, the property of the visible option of the virtual object content representing the virtual object corresponding to the augmented target object. In step 3043, by converting, from visible to invisible, the property of the visible option among the rendering options of the virtual object content included in the XR-scene content, the virtual object is not rendered in the augmented reality mode. In step 3045, by converting, from invisible to visible again, the property of the visible option among the rendering options of the virtual object content representing the virtual object corresponding to the augmented target object in the augmented reality mode, the virtual object content representing the virtual object corresponding to the augmented target object is rendered in the augmented reality mode. Accordingly, as described in the following step 3048, the rendering unit 105 generates the virtual object of the augmented target object by rendering the XR-scene content having the converted property when the augmented reality mode is selected.

In step 3046, the rendering option conversion unit 103 of the user terminal 10 converts, to a predetermined background color, the property of the ground color option instructing the color of the background in the extended reality image in the XR-scene content. As described above, the virtual reality technology provides the user with the image indicating the computer-generated object and background. When the user selects the virtual reality mode, the display unit 106 of the user terminal 10 displays, on the screen, the image indicating the virtual reality configured of the virtual object and the background rendered by the user terminal 10. When the user selects the virtual reality mode in step 303, the rendering option conversion unit 103 converts, to the predetermined background color, the property of the ground color option in the XR-scene content. Here, the background color may be set in advance to a color such as white, gray, or black by the user.

In step 3047, the rendering option conversion unit 103 of the user terminal 10 converts, to visible, the property of the visible option among the rendering options of the virtual object content included in the XR-scene content. When the user selects the virtual reality mode, the rendering option conversion unit 103 converts, from invisible to visible, the property of the visible option of the virtual object content included in the XR-scene content or maintains, in visible, the property of the visible options. The virtual object content included in the XR-scene content is rendered by converting, to visible, the visible option of the virtual object content included in the XR-scene content. As described above, in the virtual reality mode, the user terminal 10 provides the user with the image indicating the virtual reality in which both the object and the background are rendered. Therefore, the user terminal 10 renders the virtual object content included in the XR-scene content and provides the user with the image indicating the virtual object and the background.

As described above, when the user selects the augmented reality mode, in step 3043, the property of the visible option among the rendering options of the virtual object content included in the XR-scene content is converted from visible to invisible. Subsequently, when the user changes the selection to the virtual reality mode, the property of the visible option among the rendering options of the virtual object content included in the XR-scene content needs to be converted from invisible to visible again to provide the image indicating the virtual reality. Accordingly, in step 3047, the rendering option conversion unit 103 converts, to visible, the property of the visible option of the virtual object content included in the XR-scene content.

In step 3048, the rendering unit 105 of the user terminal 10 renders the virtual object content in which the property of the visible option among the rendering options in the XR-scene content is visible. The rendering unit 105 renders the virtual object content in which the property of the visible option in the XR-scene content is visible, and generates the virtual object represented by the virtual object content. When the augmented reality mode is selected, in step 3043 to step 3045, among the virtual object contents included in the XR-scene content, the property of the visible option of the virtual object content representing the virtual object corresponding to the augmented target object is converted to visible and the property of the remaining visual option of the virtual object content is converted to invisible. Therefore, the rendering unit 105 renders the virtual object content representing the virtual object corresponding to the augmented target object and generates the virtual object of the augmented target object. When the virtual reality mode is selected, since the property of the visible option of the virtual object contents included in the XR-scene content is visible, the rendering unit 105 renders the virtual object content included in the XR-scene content and generates the virtual object. The rendering unit 105 renders the XR-scene content and generates the extended reality image including the rendered virtual object. In summary, when the user selects the augmented reality mode, the rendering unit 105 generates the augmented reality image including the rendered virtual object of the augmented target object in which the image indicating the reality space generated by the camera module 102 is the background. When the user selects the virtual reality mode, the rendering unit 105 renders the XR-scene content and generates the virtual reality image including the virtual object of virtual object content included in the XR-scene content on the ground of a predetermined background color.

Referring to FIG. 3 again, in step 305, the display unit 106 of the user terminal 10 displays the generated image data of the extended reality. The display unit 106 displays the image data of the extended reality generated in step 305, and provides the user with the screen of the extended reality. When the augmented reality mode is selected, the display unit 106 displays the augmented reality image data indicating the reality space and the rendered augmented target object. More specifically, the display unit 106 displays, on the screen imaged by the camera module 102 of the user terminal 10, the extended reality image data of the including the virtual object of the augmented target object rendered by the rendering unit 105. The user of the user terminal 10 can watch the screen imaged by the camera module 102 and the virtual object of the augmented target object together via the display unit 106, thereby experiencing the augmented reality environment.

When the virtual reality mode is selected, the display unit 106 displays the virtual reality image data including the rendered virtual object. More specifically, the display unit 106 displays the extended reality image data including the virtual object rendered by the rendering unit 105. The user of the user terminal 10 can watch the virtual object generated by the user terminal 10 via the display unit 106, thereby experiencing the virtual reality environment.

Figure 5A:
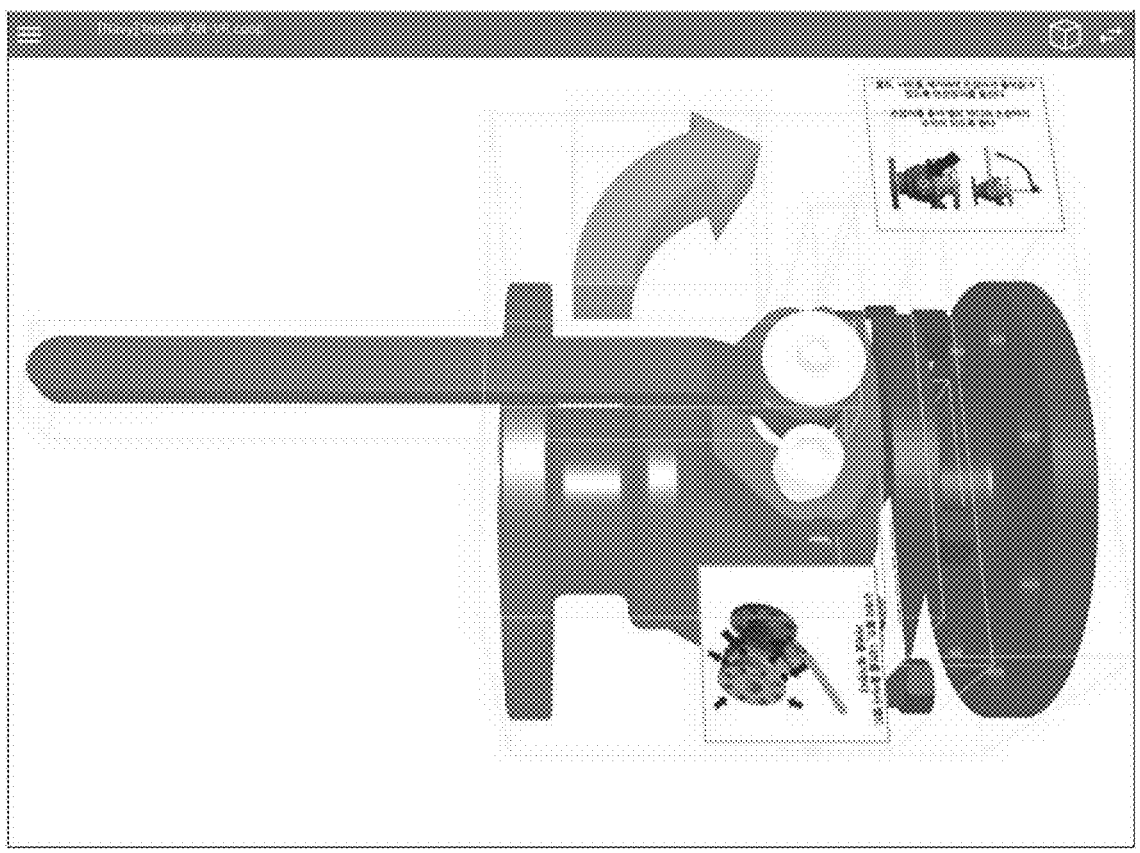
FIGS. 5A and 5B are views illustrating an example screen in which an image rendered by the integrated rendering method is displayed on a display unit.
Figure 5B:

FIGS. 5A and 5B are views illustrating an example screen in which the extended reality image including the virtual object rendered by a rendering method for the rendering option conversion unit of the extended reality. More specifically, FIG. 5A is an exemplary screen in which the virtual reality image indicating the virtual reality is displayed by the display unit 106 of the user terminal 10, and FIG. 5B is an exemplary screen in which the augmented reality image indicating the augmented reality is displayed by the display unit 106. Referring to the example of FIG. 5A, when the user selects the virtual reality mode, the user terminal 10 renders the virtual object content included in the XR-scene content, and the display unit 106 of the user terminal 10 displays the virtual reality image that displays the background of the ground color and the rendered virtual object. In the example screen of FIG. 5A, a valve, a valve handle, an arrow displaying a rotation direction of the valve handle, and an annotation explaining a manipulation method of the valve handle are rendered as 3D virtual objects, and displayed in a virtual environment space of a ground color.

Referring to FIG. 5B, as described above, when the user selects the augmented reality mode, the user terminal 10 coverts, from visible to invisible, the property of the visible option of the virtual object content included in the XR-scene content, detects the augmented target object, and converts, to visible, the property of the visible option among the virtual object contents representing the virtual object corresponding to the augmented target object. Therefore, the user terminal 10 renders the virtual object content representing the virtual object corresponding to the augmented target object, and displays the virtual reality image including the virtual object of the augmented target object on the image indicating the reality space imaged by the camera module 102. In the example screen of FIG. 5B, the virtual object of the valve handle, and the virtual object of the arrow displaying the rotation direction of the valve handle, which are the augmented target objects, are displayed on the screen of the reality space where the valve is positioned.

Comparing FIGS. 5A and 5B, in the case of the virtual reality mode, the entire valve is rendered on the virtual reality background of the ground color and displayed on the virtual space of the ground color, whereas in the case of the augmented reality mode, only the valve handle, which is the augmented target, is rendered, and the screen of the reality space being imaged by the camera module 102 of the user terminal 10 and the virtual object of the valve handle are displayed together.

In step 306, the processor 101 of the user terminal 10 receives an input, from the user via the input module 107, of a termination command of the extended reality application, a change command of the extended reality mode, a manipulation command of the virtual object, and the like. The user of the user terminal 10 may input commands such as the application termination, the change of the extended reality mode, and the position/direction manipulation of the virtual object which are executed in the user terminal 10 via the input module 107.

In step 307, the processor 101 of the user terminal 10 determines whether the command input in step 306 is received to change the extended reality mode. If the command to change the extended reality mode is received from the user of the user terminal 10 in step 306, the process proceeds to step 304, otherwise the process proceeds to step 308.

In step 308, the processor 101 of the user terminal 10 processes the command input in step 307. The processor 101 processes the command input by the user in the extended reality application. For example, when the user inputs the command to terminate the extended reality application, the processor 101 ends the extended reality application. When the user inputs the command to manipulate the position and direction of the virtual object, the processor 101 changes the position and direction of the virtual object manipulated on the extended reality according to the input command. If the command to terminate the application is input in step 308, the extended reality application is ended, otherwise, the process returns to step 306 again.

As described above, the XR-scene content includes at least one virtual object content representing the virtual object, and the virtual object content is rendered according to the selected extended reality mode. The virtual object contents are classified according to whether they are rendered in the extended reality mode. More specifically, the virtual object contents are classified to the virtual object content for the augmented reality which is rendered when the augmented reality mode is selected, the virtual object content for the virtual reality which is rendered when the virtual reality mode is selected, and the virtual object content for the extended reality which is rendered in each of the augmented reality mode and the virtual reality mode. The XR-scene content may include all of the virtual object content for the augmented reality, the virtual object content for the virtual reality, and the virtual object content for extended reality. The XR-scene content may include at least one of the virtual object content for the virtual reality and the virtual object content for the augmented reality, and the virtual object content for the extended reality.

In the XR-scene content, the virtual object content may include a type tag representing a type of the virtual object content, an identifier tag indicating an identifier of the virtual object content, and a virtual object tag indicating metadata representing the virtual object in the extended reality. For example, in the case of the virtual object content for the virtual reality, the type tag of the virtual object content indicates the virtual object content for virtual reality. In the case of the virtual object content for the augmented reality, the type tag of the virtual object content indicates the virtual object content for the augmented reality. In the case of the virtual object content for the extended reality, the type tag indicates the virtual object content for the extended reality.

When rendering at least one virtual object content included in the XR-scene content, the rendering unit 105 renders at least one virtual object content based on at least one of the type tag of at least one virtual object content included in the XR-scene content, and the extended reality mode. More specifically, when the virtual reality mode is selected, the rendering unit 105 renders the virtual object content indicating that the type tag of the virtual object content is the virtual object content for the virtual reality, and the virtual object content indicating that the type tag is the virtual object content for the extended reality. When the augmented reality mode is selected, the rendering unit 105 renders the virtual object content indicating that the type tag of the virtual object content is the virtual object content for the augmented reality, and the virtual object content indicating that the type tag is the virtual object content for the extended reality.

FIGS. 6A to 6C are examples of the extended reality scene contents of the present invention. The extended reality (XR) scene contents illustrated in FIGS. 6A to 6C represent the extended reality image in a method in which metadata for a real object to be augmented is instructed to a tag, and real objects to be augmented are declared as a child tag of a host tag, in a group of tags. The example screens of FIGS. 5A and 5B are respectively the virtual reality image and the augmented reality image generated based on respective the XR-scene contents illustrated in FIGS. 6A to 6C. Detailed description of the illustrated XR-scene content in FIG. 6A is as follows.

Lines 6 to 7: Loading the extended reality scene interpreter.

Lines 74 to 77: Writing metadata such as a title and description of the extended reality scene.

Lines 78 to 81: Writing a basic context of the extended reality scene.

Line 82: Specifying a tracking engine to be used in the augmented reality mode.

Lines 84 to 89: Writing information on the virtual camera of the user. In the case of the virtual reality mode, the user can directly manipulate the zoom, rotation of the virtual camera, and the like, but in the case of the augmented reality mode, the user cannot directly manipulate those because those are synchronized with the information of the camera module 102 of the user terminal 10.

Lines 92 to 93: Inserting ambient light and direct light in virtual space.

Lines 95 to 117: Receiving the metadata of the actual object (valve) to be augmented. A group of virtual models to be augmented when an augmented target object is recognized by using this metadata in augmented reality mode. More specifically, line 97 is a virtual model of the valve handle, line 98 is a virtual model of the arrow, line 99 is a virtual model for the description of how to operate, line 104 is a virtual model of the valve cover, line 105 is a virtual model of a valve screw. Line 111 is not illustrated in FIGS. 5A and 5B, but is a virtual model of a seat ring, line 112 is a virtual model of a ball inserted inside the valve, and line 113 is a virtual model of the description of the seat ring and ball when the virtual models of lines 111 to 112 are rendered. Line 117 is a virtual model of a lower cover of the valve.

In the XR-scene content illustrated in FIG. 6A, the virtual object contents described in lines 96 to 100 are the virtual object contents for the augmented reality rendered in the augmented reality mode. The virtual object contents described in lines 103 to 114 are the virtual object contents for the extended reality all rendered in the augmented reality mode and the virtual reality mode. The virtual reality content described in line 117 is the virtual object content for virtual reality rendered in the virtual reality mode.

In the XR-scene content of FIG. 6A, the virtual object contents for the augmented reality of lines 96 to 100 are described as follows.

```
95    <!-- ballvalve handle -->
96    <wxr-aranchor id="STEP01"
      src="https://wxr.nyc3.digitaloceanspaces.com/ar3dp/
      target/ballvalve/01">
97      <wxr-obj id="handle" obj="00_handle.obj" mtl=
        "00_handle.mtl" base-url="https://wxr.nyc3.
        digitaloceanspaces.com/ar3 에/resources/
        models/valve_3d"></wxr-obj>
98      <wxr-obj id="handle_arrow" obj=00_arrow.obj"
        mtl="00_arrow.mtl" base-url="https://wxr.nyc3.
        digitaloceanspaces.com/ar3dp/resources/
        models/valve_3d"></wxr-obj>
99      <wxr-plane id="annotation01"
        texture="https://wxr.nyc3.digitaloceanspaces.com/
        ar3dp/resources/dialog/valve_ar_reassem/step.03.jpg">
        </wxr-plane>
100   </wxr-aranchor>
```

Here, the type tag of the virtual object content is wxr-aranchor, which indicating the virtual object content for the augmented reality rendered only in the augmented reality mode. The identifier of the virtual object content of line 96 is displayed as "STEP01". The virtual object contents (id="handle", id="handle arrow", and id="annotation01" described in lines 97 to 99) included in the wxr-aranchor tag group are rendered together when id="STEP01" having the wxr-aranchor tag is rendered.

In the XR-scene content of FIG. 6A, the virtual object contents for the extended reality of lines 103 to 107 are described as follows.

```
102    <!-- ballvalve upper cover -->
       <wxr-target id="STEP02"
       src="https://wxr.nyc3.digitaloceanspaces.com/
       ar3dp/target/ballvalve/02">
104      <wxr-obj id="cover" obj="cover.obj" mtl="cover.mtl" base-
         url="https://wxr.nyc3.digitaloceanspaces.com/
         ar3dp/resources/models/valve_ar"></wxr-obj>
105      <wxr-obj id="screws" obj="screws.obj" mtl="screws.mtl"
         base-url="https://wxr.nyc3.digitaloceanspaces.com/
         ar3dp/resources/models/valve_ar"></wxr-obj>
106      <wxr-plane id="annotation02"
         texture="https://wxr.nyc3.digitaloceanspaces.com/
         ar3dp/resources/dialog/valve_ar_reassem/step02.jpg">
```

```
          </wxr-plane>
107     </wxr-target>
```

Here, the type tag of the virtual object content is wxr-target, and indicating the virtual object content for extended reality which is rendered both in the augmented reality mode and the virtual reality mode. The identifier of the virtual object content of line 103 is displayed as "STEP02". The virtual object contents (id="cover", id="screws", and id="annotation02" described in lines 104 to 106) included in the wxr-target tag group are rendered together when id="STEP02" having wxr-target tag is rendered.

In the XR-scene content of FIG. 6A, the virtual object content for the virtual reality of line 117 is described as follows.

```
117<wxr-obj id="base" obj="base-ar.obj" mtl="base-ar.mtl" base-url="https://wxr.nyc3.digitaloceanspaces.com/ar3dp/resources/models/valve_ar"></wxr-obj>
```

Here, the type tag of the virtual object content is wxr-obj, indicating the virtual object content for the virtual reality rendered only in the virtual reality mode. The identifier of the virtual object content of line 117 is displayed as "base".

FIGS. 6B and 6C are other examples of the XR-scene content. The XR-scene content illustrated in FIG. 6B includes the virtual object content for the virtual reality that is rendered when the virtual reality mode is selected, and the virtual object content for the extended reality that is rendered in each of the augmented reality mode and the virtual reality mode. The XR-scene content illustrated in FIG. 6C includes the virtual object content for the augmented reality that is rendered when the augmented reality mode is selected, and the virtual object content for the extended reality that is rendered in each of the augmented reality mode and the virtual reality mode.

In step 3043 according to another example of the present invention, the rendering option conversion unit 103 converts, from visible to invisible, the property of the visible option of the virtual object content except for the lighting-related content in the XR-scene content. When the user selects the augmented reality mode, the rendering option conversion unit 103 converts, from visible to invisible, the property of the visible option of the virtual object content except for the lighting-related content among virtual object contents included in the XR-scene content. The XR-scene content representing the extended reality image includes the lighting-related content.

The lighting-related content is a content associated with lighting in the extended reality image when the extended reality image is generated. In reality space, lighting has no shape, but affects the color of other objects. Likewise, in the extended reality, lighting has no shape, but is an intangible object that affects the color of other objects. Due to the nature of the lighting, if the lighting-related content is not rendered when the extended reality image is generated, the rendered virtual object may have a difference in color from the target object in the reality space. Here, lighting includes direct lighting, indirect lighting, and natural light.

Figure 7:
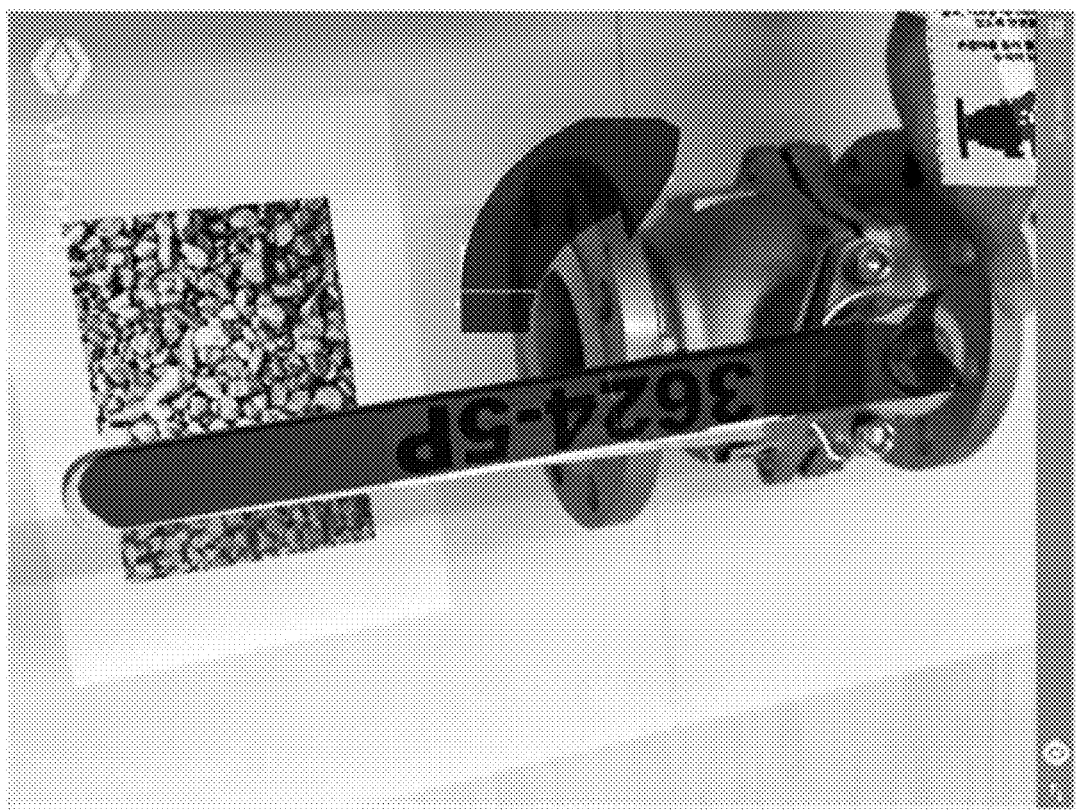
FIG. 7 is a view illustrating an example screen in which an augmented reality image is displayed on a display unit, which is generated by converting, to invisible, rendering options of all objects included in an extended reality scene content and converting, to visible, only a rendering option of the augmented target object without considering a lighting-related content.

In this regard, FIG. 7 illustrates an example of a screen displaying the augmented reality image including the virtual object of the rendered augmented target object, without considering the lighting-related content, when converting, to invisible, the property of the visible option of the virtual object content included in the XR-scene content and converting, to visible, the property of the virtual option of the virtual object content representing the virtual object corresponding to the augmented target object. Referring to FIG. 7, when the user terminal 10 renders the XR-scene content and generates the augmented reality image, in a case where the lighting-related content included in the XR-scene content is not rendered together, the effect of lighting on the virtual object in the virtual space is not taken into account, when the XR-scene content is rendered. Therefore, the color of the rendered virtual object may be different from the color of the real object viewed in the reality space.

When the example screen illustrated in FIG. 5B is compared with the example screen illustrated in FIG. 7, in the example screen illustrated in FIG. 7, the user terminal 10 converts, to invisible, the property of the visible option of the lighting-related content and generates the augmented reality image during rendering, and thereby the color of the virtual object of the rendered valve handle appears in black which is different from the color of the valve handle in the reality space. On the other hand, in the example screen illustrated in FIG. 5B, the user terminal 10 generates the augmented reality image without converting, to invisible, the property of the visible option of the lighting-related content during rendering, and thereby the color of the virtual object of the rendered valve handle appears in bright gray which is the same as the color of the valve handle in the reality space.

As described above, according to another example of the present invention, when the augmented reality image data is generated, the augmented target object and the lighting-related content are rendered together. Therefore, the virtual object of the augmented target object is rendered in a color similar to that of the reality object appeared in the reality space. Accordingly, the user terminal 10 may provide the user with the augmented reality environment close to the reality, and the user may have high immersion feeling due to the augmented reality image close to the reality. Meanwhile, the examples of the present invention described above can be implemented in a general-purpose digital computer that operates the program using a computer-readable recording medium capable of being created in a program executable on a computer.

In addition, the structure of data used in the above-described examples of the present invention can be recorded on a computer-readable recording medium via various means. The computer-readable recording medium includes a storage medium such as a magnetic storage medium (for example, a ROM, a floppy disk, a hard disk, or the like), or an optical reading medium (for example, a CD-ROM, a DVD, or the like).

So far, the present invention is described focused on preferred examples. Those skilled in the art to which the present invention pertains will understand that the present invention may be implemented in a modified form without departing from the essential characteristics of the present invention. Therefore, the disclosed examples should be considered in terms of explanation, not limitation. The scope of the present invention is illustrated in the claims rather than the foregoing description, and all differences within the equivalent range should be interpreted as being included in the present invention.

SIGNS LIST 10 user terminal
101 processor
102 camera module
103 rendering option conversion unit 104 object detection unit
105 rendering unit
106 display unit
107 input module
108 communication module
109 storage
20 extended reality server

What is claimed is:

1. An integrated rendering method for various extended reality modes, the method comprising:
   a step of loading an extended reality scene content representing an extended reality image and including at least one virtual object content representing at least one virtual object included in the extended reality image, from a storage;
   a step of inputting a selection, from a user, of any one extended reality mode among a plurality of extended reality modes including a virtual reality mode and an augmented reality mode; and
   a step of maintaining or converting a property of each of a plurality of rendering options for the at least one virtual object content according to the selected extended reality mode, and rendering the at least one virtual object content having the maintained or converted property,
   wherein the step of rendering includes
   a step of converting, from visible to invisible, a property of a visible option instructing visible or invisible of the at least one virtual object content among the plurality of rendering options of the at least one virtual object content, when the selected extended reality mode is the augmented reality mode;
   a step of detecting an augmented target object of the augmented reality mode from reality space image data indicating a reality space generated by a camera module;
   a step of converting, from invisible to visible again, the property of the visible option of a virtual object content corresponding to the detected augmented target object, among the at least one virtual object content; and
   a step of rendering the virtual object content of which the property of the visible option is converted to be visible in the extended reality-scene content.

2. The integrated rendering method for various extended reality modes of claim 1,
   wherein in the step of converting, from visible to invisible, the property of the visible option,
   converting, from visible to invisible, a visible option of a remaining virtual object content, wherein the remaining virtual object content is not a lighting-related content in the extended reality-scene content.

3. The integrated rendering method for various extended reality modes of claim 1,
   wherein the step of rendering further includes
   a step of converting a ground color option included in the extended reality-scene content to transparent and converting a background of the extended reality image to the reality space image data, when the selected extended reality mode is the augmented reality mode.

4. The integrated rendering method for various extended reality modes of claim 3,
   wherein the step of rendering further includes
   a step of converting, to white, the ground color option included in the extended reality-scene content and converting, to white, the background of the extended reality image.

5. The integrated rendering method for various extended reality modes of claim 1,
   wherein in the step of detecting the augmented target object,
   extracting a shape included in the reality space image data, comparing the extracted shape with a shape of the augmented target object, and detecting a shape matching the shape of the augmented target object as the augmented target object.

6. A non-transitory computer-readable recording medium recording a program for executing the method of claim 1 on a computer.

7. A user terminal for integrated rendering of various extended reality modes comprising:
   a processor that loads an extended reality scene content representing an extended reality image and including at least one virtual object content representing a virtual object included in the extended reality image from a storage;
   an input module that inputs a selection, from a user, of any one extended reality mode of a plurality of extended reality modes including a virtual reality mode and an augmented reality mode;
   an object detection unit that detects an augmented target object of the augmented reality mode from reality space image data indicating a reality space generated by a camera module;
   a rendering option conversion unit that converts, from visible to invisible, a property of a visible option instructing visible or invisible of the at least one virtual object content among the plurality of rendering options of the at least one virtual object content, when the selected extended reality mode is the augmented reality mode, and then converts from invisible to visible again, the property of the visible option of a virtual object content corresponding to the detected augmented target object, among the at least one virtual object content; and
   a rendering unit that renders the virtual object content of which the property of the visible option is converted to be visible in the extended reality-scene content.

8. A non-transitory recording medium on which an extended reality-scene content including at least one of a virtual object content for a virtual reality and a virtual object content for an augmented reality, and a virtual object content for an extended reality is recorded,
   wherein the virtual object content for virtual reality includes a type tag indicating the virtual object content for the virtual reality, and a virtual object tag indicating metadata representing a virtual object for the virtual reality,
   wherein the virtual object content for the augmented reality includes a type tag indicating the virtual object content for the augmented reality, and a virtual object tag indicating metadata representing a virtual object for the augmented reality, and
   wherein the virtual object content for the extended reality includes a type tag indicating the virtual object content for the extended reality, and a virtual object tag indicating metadata representing a virtual object for the extended reality,
   wherein a property of each of a plurality of rendering options for the virtual object content for the virtual reality is capable of being maintained, and the virtual object content for the virtual reality is capable of being rendered according to the maintained property, wherein a property of each of a plurality of rendering options for the virtual object content for the augmented reality is capable of being converted, and the virtual object content for the augmented reality is capable of being rendered according to the converted property, wherein the plurality of rendering options includes a ground color option indicating a color of a background of the extended reality image in the extended reality-scene content and a visible option instructing visible or invisible of the virtual object included in the extended reality image, and wherein the ground color option included in the extended reality-scene content is set to be white, and the background of the extended reality image is set to be white.

9. The non-transitory recording medium on which an extended reality-scene content is recorded of claim 8, wherein the virtual object content for the virtual reality is capable of being rendered in a virtual reality mode, wherein the virtual object content for the augmented reality is capable of being rendered in an augmented reality mode, and wherein the virtual object content for the extended reality is capable of being rendered in each of the virtual reality made and the augmented reality mode.

* * * * *